United States Patent [19]

Napadow

[11] Patent Number: 4,608,064
[45] Date of Patent: Aug. 26, 1986

[54] MULTI-WASH SPRAY BOOTH AND METHOD OF CAPTURING AIR BORNE PARTICLES

[75] Inventor: Stanley C. Napadow, Elgin, Ill.

[73] Assignee: Protectaire Systems Co., Elgin, Ill.

[21] Appl. No.: 688,572

[22] Filed: Jan. 3, 1985

[51] Int. Cl.[4] .............................................. B01D 47/10
[52] U.S. Cl. ....................................... 55/238; 55/240;
98/115.2; 261/30; 261/62; 261/DIG. 54
[58] Field of Search ................. 98/115.2; 55/240, 241,
55/238; 261/62, 30, DIG. 54

[56] References Cited

U.S. PATENT DOCUMENTS

| | | | |
|---|---|---|---|
| 2,257,516 | 9/1941 | Roche, Jr. | 91/60 |
| 2,259,626 | 10/1941 | Erikson | 91/60 |
| 2,546,259 | 3/1951 | Fenn | 55/238 |
| 2,694,466 | 2/1953 | Bingman | 183/22 |
| 2,805,844 | 9/1957 | McMaster | 98/115.2 |
| 3,018,847 | 1/1962 | Stanly | 183/22 |
| 3,138,647 | 6/1964 | Krantz | 55/241 |
| 3,475,202 | 10/1969 | Bok | 117/102 |
| 3,795,093 | 3/1974 | Gerhard et al. | 98/115.2 |
| 3,884,654 | 5/1975 | Crevoisier et al. | 98/115.2 |
| 3,932,151 | 1/1976 | Lau | 55/229 |
| 4,139,584 | 2/1979 | Holmberg | 261/112 |
| 4,237,780 | 12/1980 | Truham | 98/115.2 |
| 4,257,784 | 3/1981 | Gebhard et al. | 98/115.2 |
| 4,350,506 | 9/1982 | Otto | 55/241 |
| 4,417,541 | 11/1983 | Schafer | 98/115.2 |
| 4,484,513 | 11/1984 | Napadow | 98/115 |
| 4,515,073 | 5/1985 | Dorsch et al. | 98/115.2 |
| 4,521,227 | 6/1985 | Gerdes et al. | 55/241 |

FOREIGN PATENT DOCUMENTS

| | | | |
|---|---|---|---|
| 642177 | 4/1964 | Belgium | 55/240 |
| 626191 | 12/1926 | France . | |
| 1192088 | 4/1959 | France . | |
| 296294 | 4/1954 | Switzerland | 98/115.2 |
| 710173 | 6/1954 | United Kingdom . | |
| 628379 | 10/1978 | U.S.S.R. | 55/238 |

Primary Examiner—Tim Miles
Attorney, Agent, or Firm—Fitch, Even, Tabin & Flannery

[57] ABSTRACT

A spray booth that provides an improved, more uniform circulation of air past the operator and workpiece and a more effective cleaning of the air of oversprayed particulates. A plurality of water washes are utilized in the air cleaning section of the spray booth. The spraying section includes an open-faced front user portal with a grated flooring. The cleaning section includes three water washes. The first water wash underlies the grated flooring and has a spillway that slopes downward from the front of the portal towards the rear. The second water wash is disposed at the rear of the spraying section and includes a plurality of baffle surfaces that extend across the width of the spraying section from the ceiling toward the spillway, with the bottoms of the baffle surfaces and the surface of the spillway defining a space therebetween. A panel is provided for deflecting air flow downwardly from the space behind the baffle surfaces, with the panel being spaced from the baffle surfaces in an increasing distance in the downward direction. The air from the first and second water washes flows into a restricted throat to increase its air velocity sufficiently to lift water particles and this high velocity air flow and water particle mixture is discharged into an enlarged third water wash and is deflected to cause turbulence to wet air borne spray particles.

16 Claims, 2 Drawing Figures

MULTI-WASH SPRAY BOOTH AND METHOD OF CAPTURING AIR BORNE PARTICLES

This invention relates to a spray booth, and, more particularly, to a water wash spray booth that employs a plurality of water washes to more completely remove particulates from the air and also has an improved air flow pattern therethrough.

In spray booths, it is necessary to maintain a steady, even flow of air therethrough for two distinct, but equally important reasons. Constant air flow keeps the airborne particulates sprayed in the booth, which are often toxic, away from workers who might inhale them. Presently, occupational safety and health standards mandate that if spraying is to be performed by a worker, rather than automatically by a machine, there is to be a minimum uniform air flow past the worker of 100 cfm. The constant air flow also keeps away from the spray equipment and workpiece oversprayed particulates, which might otherwise cover the spray equipment or come to rest upon the workpiece and cause an uneven finish or, perhaps, to form drips on the workpiece. Additionally, environmental clean air standards require that the emissions from spray booths conform to certain maximums with regard to the parts per million of particulates.

Prior art spray booths have had limited success in attaining these objects because of uneven air flow patterns throughout the booths or because they employed high-priced replaceable fibrous filter elements, through which air is circulated. Indeed, when such filters become clogged with sprayed particulates, the air flow therethrough is substantially reduced, thus decreasing the air flow past the operator. Further, the air cleaning ability of the spray booth is greatly reduced and productivity is reduced due to the need to shut down the system to replace the filters.

Today, more and more paint spraying is done with automatic spray equipment and often the equipment is used to spray different articles. In some instances, the article may be sprayed from underneath while for other articles in the same spray booth the articles may be sprayed from above. For still other articles, the spray nozzle may be reciprocated vertically and up close to the ceiling of the booth, which is usually a relatively dead air location. Thus, there is a need for a spray booth which is versatile enough to handle such different types of spraying and, yet meet environmental standards as to emissions.

Emission standards are set very high today such that spray booths which were previously used have been taken off the market because of their failure to meet emission standards. While the prior art may suggest various techniques for spraying water in a spray booth which have a superficial resemblance to booths which meet current industry and government standards as to air flow and as to emissions, such booths and techniques can not and do not meet today's rigorous requirements as does the present invention.

Accordingly, a general object of the invention is to provide a new and improved spray booth for removing air borne particulates.

These and other objects and advantages of the invention will become apparent from the following detailed description taken in conjunction with the accompanying drawings in which FIG. 1 is a cross-sectional view of a multi-water-wash spray booth embodying the present invention;

DETAILED DESCRIPTION

Figure 1:
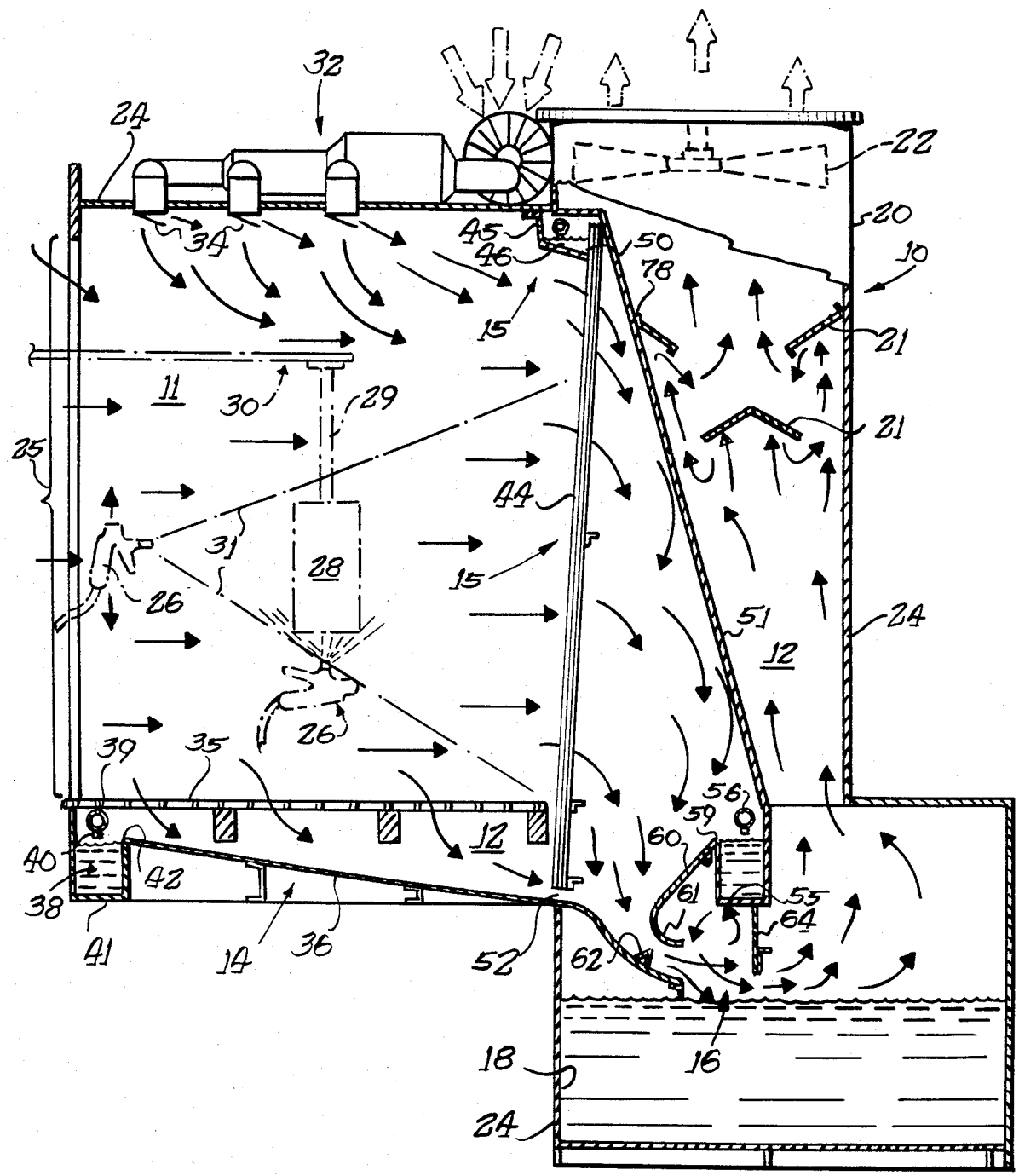

Referring to the figures of the drawings, there is illustrated a spray booth, generally indicated by 10, embodying the present invention. The spray booth 10 includes an open-faced spraying section 11, and an air cleaning section wherein paint-laden air that is drawn through the booth 10 is cleaned. The air cleaning section 12 includes three water washes 14–16 that provide water to entrain oversprayed paint particles. A water reservoir 18 is located in the air cleaning section 12 downstream of the water washes 14–16.

Disposed in the water reservoir 18 is a level sensing device, not shown, and replacement water is automatically supplied to the reservoir to prevent the water level from falling below a desired minimum. A pump, not shown, circulates water from the reservoir 18 to the various water washes 14–16. As air borne particles of paint are wetted by water or water particles, they become heavier and drop into the water reservoir 18 resulting in relatively clean air being exhausted from a water eliminator section 20. Paint particles are transported by the water 19 into and are held in the reservoir 18 as the air flows outwardly into a rear water eliminator section 20. The paint particles, being heavier than water, will sink to the bottom of the reservoir 18, from which they are periodically removed. Alternatively, paint particles may be held up on the surface of the water by a flocculant and periodically skimmed from the tank.

The water eliminator section 20 includes baffles 21 that remove water particles from the air prior to its being exhausted. A centrifugal blower 22 disposed within the passageway 20 is sufficiently powerful so as to pull air through the booth 10 at a rate of 100 cfm past the spray booth operator, if any, who would be standing in the front of the booth. By maintaining the air moving at at least this rate, it is assured that airborne paint particles will not collect and coat surfaces in the spray booth or agglomerate in stagnant air areas and ultimately drop onto equipment in the booth or, worse yet, on an article 28, but instead are carried through the water washes.

Referring in greater detail to FIG. 1, the spray booth 10 includes a housing 24, typically made from metal panels, that defines a user portal 25. In practice, the user portal 25 may typically be approximately nine feet high, ten feet wide, and seven and one-half feet deep. Within the portal 25, a user or automated equipment directs a paint spray nozzle 26 or the like at an article 28 suspended on a conveyor hook 29 of a conveyor system 30 that carries successive objects laterally across the booth 10 in front of the user. (While the present invention will be described in connection with a paint spray device, the spray booth may be used for other spraying operations.) Some of the solid airborne spray particles will not adhere to the article 28 and constitute "overspray", initially coming within an area symbolically defined by the lines 31. The spray nozzle may be pointed downwardly to paint some articles with the spray being directed towards the floor of the booth. For other articles, the spray nozzle may be pointed upwardly to spray the undersides of the articles. In still other applications, the nozzle 26 is reciprocated vertically while spraying.

Although the centrifugal blower 22 is powerful, and, in practice, is able to circulate air therethrough at a high flow rate, e.g. at a rate of 18,000 cfm, the air velocity throughout the spray booth is not constant. Generally, velocity is a function of the cross-sectional area of the air flow passageway at any particular point. While an air flow of 100 cfm must be maintained past the user, it is found that in the front of the booth, where the cross-sectional area is the largest, pockets of relatively "dead" air (i.e., pockets of air moving at a slow velocity) may form around or near the conveying system 30. As a result, oversprayed particulates tend to remain in the dead air space and, consequently, are more likely to settle upon the conveying equipment 30 or the workpiece 28, causing undesirable coating of these items. In order to prevent such a dead air space from forming in the spray booth and to keep paint from accumulating at or around the ceiling of the spray booth particularly where the nozzle 26 is directed upwardly, the invention provides auxiliary air circulation means, generally indicated by 32, supported on the roof and having nozzles 34 extending through the ceiling and spaced across the width of the booth from the front to the rear thereof. The nozzles 34 direct air from the front of the booth toward the rear, and, in practice in this illustrated embodiment of the invention, the auxiliary blower 32 is able to move air at a velocity of up to 800 fpm, with a flow rate of up to 1050 cfm. Thus, upwardly directed spray from a nozzle is taken away from the ceiling before it can accumulate and drip down onto an article.

Figure 3:
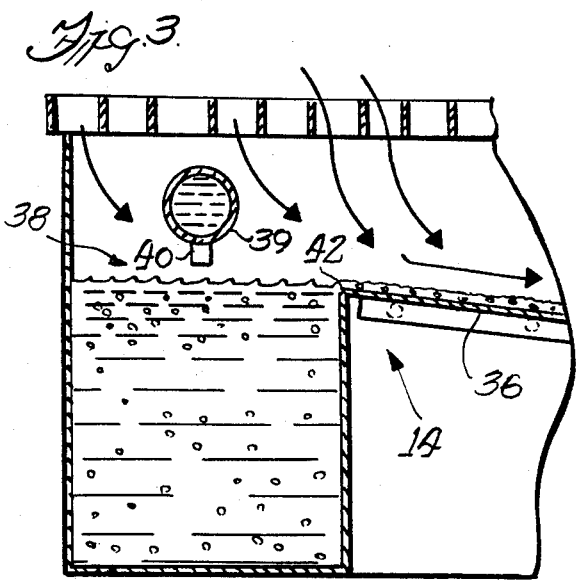
FIG. 3 is an enlarged, fragmentary, cross-sectional view of another of the water washes utilized in the spray booth illustrated in FIG. 1.

The floor of the spraying section 11 has air passage therethrough and herein comprises a grate 35 that extends the width of the spraying section from the front to the rear so as to allow air and airborne particulates to flow therethrough. In order to clean the air flowing through the grated flooring 35, water wash 14 underlies the flooring 35. With particular reference to FIGS. 1 and 3, the water wash 14 includes a spillway 36 that slopes downward from the front to the rear of the spraying section at approximately a 10° angle. This angle allows water to flow more slowly and evenly across the spillway 36. Further, a more uniform air flow across the bottom of the spraying section is attained by the increasingly larger cross-sectional area underneath the grated flooring 35 that accommodates the increasing amount of air traveling towards the rear of the spraying section. A continuous, thin sheet of water is introduced across the spillway surface 36 by means of a reservoir, generally indicated by 38, that includes an inlet manifold 39 that extends across the booth at substantially the opening of the user portal 25. The manifold 39 includes a plurality of downward pointing nozzles 40 that supply water to a trough 41. When the trough 41 is filled, water will flow over the upper, laterally-extending weir edge 42 of the trough 41, the edge 42 being coextensive with the upper edge of the spillway 36, to widely distribute water over the entire width of the spillway 36. As the water continuously covers and flows down the spillway 36, a downdraft of air and particulates will contact the water only, thus entraining some of the airborne particles therein. A constant and even thin film of water covering the spillway surface at all times assures that it will not become coated with paint particles.

Figure 2:
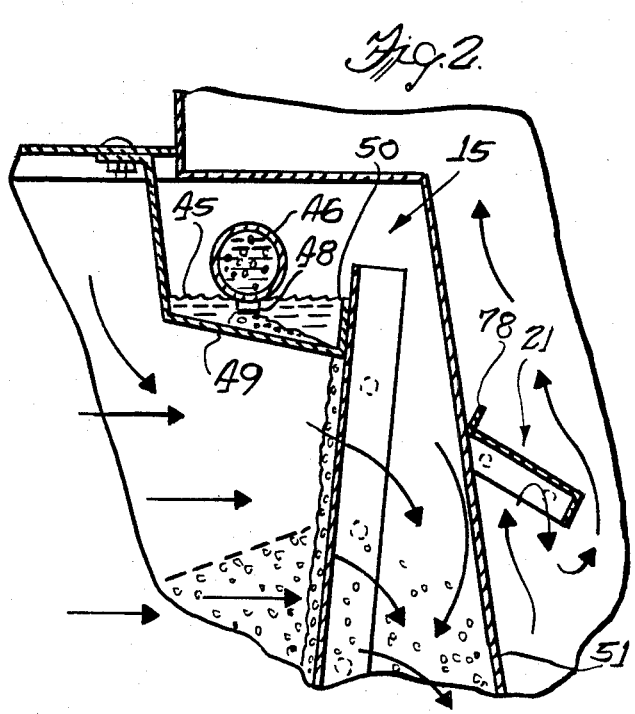
FIG. 2 is an enlarged fragmentary, cross-sectional view of one of the water washes utilized in the spray booth illustrated in FIG. 1.

Referring to FIGS. 1 and 2, the second water wash 15 provides cascading water flowing downwardly along the surfaces of staggered baffles 44, the cascading water impinging airborne paint particles which are trapped thereby. Such a water wash, (which is more particularly shown and described in U.S. Pat. No. 4,484,513, issued Nov. 27, 1984, herein incorporated by reference) includes a plurality of vertically extending baffle panels which have their edges overlap in a vertical and lateral direction to define slots. The slots extend the entire height of the work area of the booth and the irregular path defined by the slots creates air turbulence that promotes contact between airborne paint particles and the water cascading down the surfaces of the baffle panels. The baffles are slightly tilted toward the front of the spray booth at approximately a 5° angle from vertical in order to slow the cascade and to more evenly distribute the cascading water across the baffle. A thin continuous film of water wets the front surfaces of the baffle panels. Upon contacting the sheets of waters on the panels, the paint droplets will be carried by the water to the bottom edge of the spillway 36. Water is supplied to the baffle surfaces by means of a reservoir, generally indicated by 45, that includes an inlet manifold 46 that extends across the width of the booth. The manifold 46 includes a plurality of downwardly pointing nozzles 48 extending therefrom. The manifold supplies water to a distribution trough 49, and water overflows the upper, laterally-extending weir edge 50 of the trough 49 to widely distribute a continuous water film over the entire width of the baffle surfaces to prevent their becoming coated with paint.

An air-deflecting panel 51 is provided behind the baffle panels 44 to direct the air which has passed through the baffles toward the bottom of the booth. The panel 51 is a substantially flat sheet which slants towards the back of the booth from the front toward the bottom at an angle of approximately 15° from vertical, thus providing an increasingly larger cross-sectional area behind the baffle surfaces 44 in a downward direction to accommodate the increasing amount of air being deflected downward. Thus, a more uniform air flow across the lower ends of the baffle surfaces 44 is maintained. The water flowing down the spillway 36 flows under the bottom edges of the baffle surfaces and the spillway 36 define a slot or space 52 therebetween through which air and the water can flow. All of the air flowing through floor grate must flow through the slot 52 and through a water fall wash of the water falling from the bottom ends of the panels and this also aids in removing air borne particles. That is, water dropping from the panels creates a water curtain through which the air stream passing through the grate must flow with particles in the air being wetted in this water curtain.

In order to maximize the air cleaning capability of the spray booth, a third, high-velocity, high-turbulence water wash 16 is employed to scrub the air after it has passed through both the downdraft and baffle water washes 14, 15. This water wash 16 forms a narrowed or restricted throat or passageway 63 through which all of the air and all of the water must pass in this embodiment of the invention. The restricted throat 63 greatly accelerates the air passing therethrough to a predetermined velocity, e.g. in excess of 5,000 fpm, with a predetermined static pressure drop across the passageway of approximately four to five inches of water. Disposed within the passageway is a water lift and turbulence amplifier 62 that promotes formation of water vapor and the mixing between the airborne particulates and the water vapor or water droplets in the air.

Figure 4:
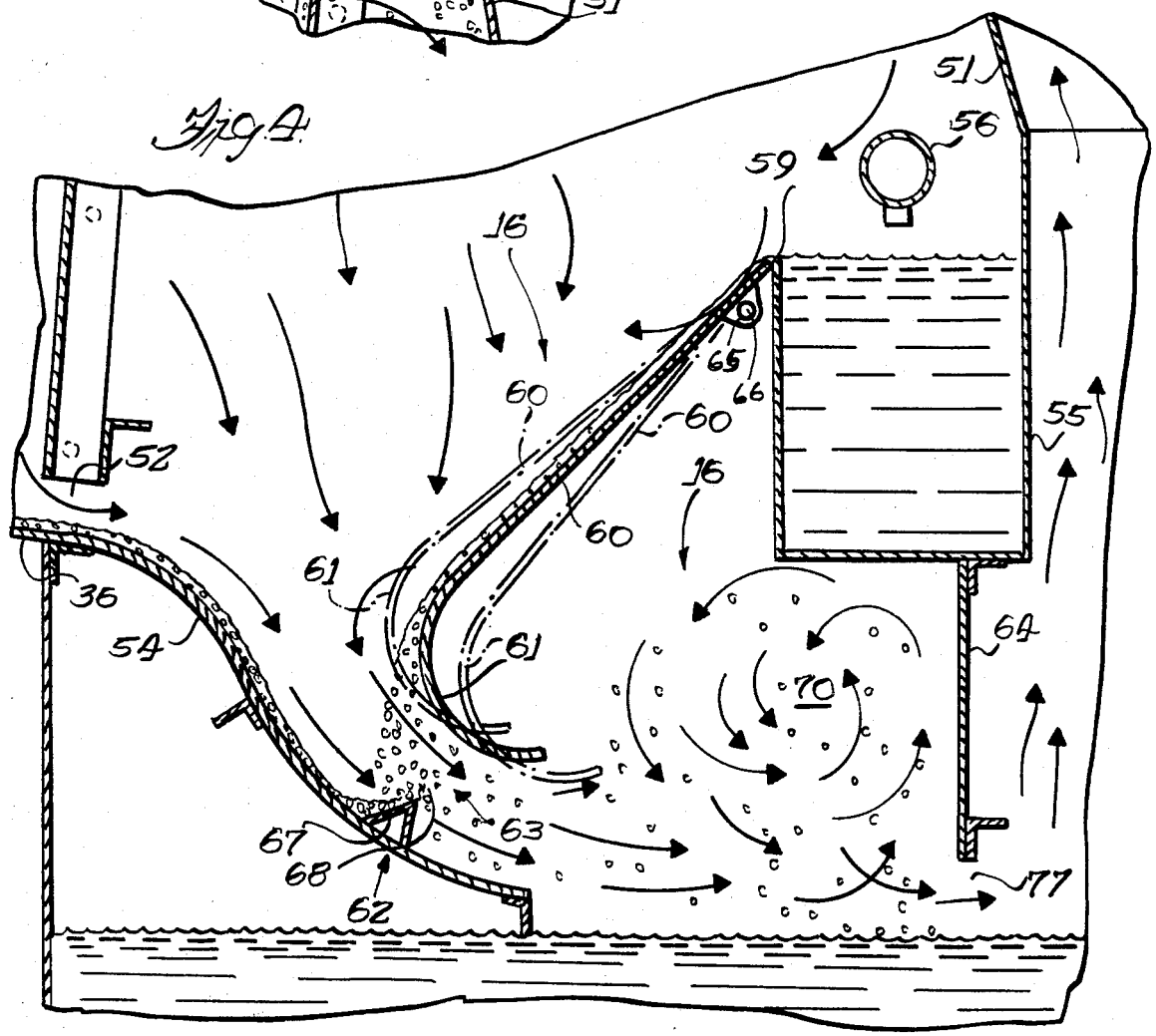
FIG. 4 is an enlarged, fragmentary, cross-sectional view of a further water wash including a turbulence amplifier utilized in the spray booth illustrated in FIG. 1.

Referring now more particularly to FIG. 4, the turbulent water wash 16 includes a curved ramp 54 integral with the lower end of the spillway 36 and sloping downward from the space 52 defined by the lower end of the baffle panels 44 and the surface of the spillway 36. Accordingly, the water flowing down off the lower end of the baffle panels 44 is added to the water flowing down the spillway 36 to further flow down the ramp 54 into the restricted throat 63. Depending from the bottom edge of the air-deflecting panel 51 is a water distribution trough 55 that is supplied with water by an inlet manifold 56. The manifold 56 extends across the booth and is provided with a plurality of downward pointing nozzles 58. Adjacent to the upper laterally extending weir edge 59 of the trough is a deflector plate 60 whose distal end 61 terminates in a semi-circular section that is spaced from the surface of the ramp 54. The water overflows the weir edge 59 of the trough 55, and is widely distributed to wet and cover the entire width of the deflector plate 60 and the water drops into the restricted throat or slot 63 between the distal end 61 of the deflector plate 60 and the ramp surface 54 and into the high-velocity air. Herein, the distal end is curved upwardly and rearwardly so that the water thereon may fall under gravity into the throat 63 to become air borne because of the high velocity of air flow through the slot.

It has been found that there is a tendency due to surface tension for the water flowing down the ramp 54 to remain thereon and it is desired to break this surface tension and to lift a substantial quantity of this water from the ramp and mix it turbulently with the air in order to wet any paint particles having passed through the previous water washes. To the end of increasing the amount of water lifted by the high velocity air flow through the throat 63, usually the air velocity is in the range of 4000 to 5000 fpm. To these ends the ramp 54 may be provided with a water lift means 62 in the form of an upwardly inclined ramp or ski jump that raises the water into the high velocity air stream and defines at its edge 68 the smallest cross sectional area and hence the highest air velocity within the throat 63. Thus, the water flowing down the ramp 54 flows up an inclined face 67 of the wedge and is picked off the edge 68 of the wedge by the high velocity air flow through the slot. After passing through this restricted throat 63, the air is expanded and swirled in a turbulent area 70 on the downstream side of the deflector plate 60. The area 70 is an area of high turbulence and swirling and mixing of water borne air and paint particles to wet the same. The high velocity air leaving the throat 63 expands immediately into a large open space or area 70 and is directed to hit a deflector panel 64 to cause the air to bounce and swirl upwardly as indicated by the arrows in FIG. 4. This increases the air turbulence and the amount of time that the water and air borne water particles stay in the turbulent area 70 and also aids in having the paint and water particles contact the surface of the water 19 in the reservoir 18 before traveling up the eliminator 20. The panel 64 depends from the bottom edge of the water distribution trough 55, in this instance. The panel 64 extends to a predetermined distance above the surface of the water 19 so as to define a slot 77 through which the air and air borne particles must flow before flowing into the eliminator section 20.

The velocity of the air passing through the space defined by the ramp surface 54 and the deflector plate 60 may be altered by adjusting the cross-sectional area of the slot 63. Thus, in keeping with the invention, the air deflector plate 60 is pivotable about its upper end. To this end, the deflector plate 60 includes ears 65 that capture an axle 66, about which the deflector plate 60 may rotate. The deflector plate 60 may be maintained in its desired location by any well known means such as clamps, etc. In use the operator will adjust the width of the slot 63 by pivoting the deflector plate 60 to increase or decrease the space between the wedge edge 68 and facing curved distal end 61 of the deflection plate to increase or decrease or the maximum air flow velocity through the slot 63. It is preferred to swing the deflector plate until the static air pressure at the slot is between 4 and 5 inches of water and at this pressure the air velocity will be in the range of 4000 to 5000 fpm for the booth illustrated and described herein. At this air velocity, the water will be lifted and air borne as the water discharges from both the ramp 54 and from the deflector plate and is carried rearwardly into the turbulent area 70 for the final wash of paint particles. If the air velocity is too high, the water particles may be carried by the air through the eliminator section 20; and, if too low, sufficient water will not be lifted.

Generally speaking, the action is akin to a no-pump spray lift action which usually requires about 4000 to 5000 fpm velocity to lift the water to form a water wash.

In order to cause water particles to be removed from the air prior to the air being exhausted through the eliminator section 20, a plurality of baffles 21 are provided therein to interdict upward flowing air and to deflect the same. The baffles 21 are generally flat, narrow sheets extending across the booth that slant downwardly within the exhaust duct. Flanges 78 are formed along and extend perpendicularly from each edge of the baffles 21 to add rigidity thereto. The baffles interdict the air and cause it to change direction and this causes the velocity of air borne water particles to slow down and to drop. In order to further reduce the ability of the air exhausting through the passageway to carry water and/or paint particles, the cross-sectional area of the duct increases in the upward direction so as to reduce the velocity of the air flowing therethrough. The water particles collect on the baffles and also drop into the underlying reservoir tank for recirculation Thus, substantially clean air is exhausted through the duct.

In actual tests, the spray booth described herein has had emissions of only 0.75 grains per hour and has been tested to provide a 99.98% efficiency on smoke tests. Such efficiencies demonstrate the effectiveness of the present invention.

Thus, it can be seen that a multi-water-wash spray booth has been provided that provides an improved, more uniform circulation of air past the operator and more effectively cleans the air of oversprayed particulates. While the invention has been described in terms of a preferred embodiment, it is not intended to so limit the invention. On the contrary, it is intended to cover all alternatives, modifications and equivalents within the scope of the invention as defined by the appended claims.

What is claimed is:

1. In a spray booth for capturing air borne particles by wetting the same with a liquid, said spray booth comprising:

a housing having a forward spraying chamber in which will be present air borne spray particles, a first verticle baffle wash means located rearwardly of the spraying chamber and having a plurality of staggered baffle plates through which a first air stream flows rearwardly in a generally horizontal path from the spray chamber, water application means for flowing a cascade of water down the panels for trapping air borne spray particles being carried by the first air stream, a floor in said spray chamber having air flow passages therethrough through which a second air stream flows in a downward path through the floor passages at a location forwardly of said first vertical baffle wash means, a second wash means for washing the second air stream for removing air borne spray particles from the second air stream, means for directing the first air stream downwardly and means for directing the second air stream rearwardly for convergence with the first air stream to form combined air streams, a common throat means for receiving the air flow of said combined air streams for raising the velocity of the combined air streams to cause liquid flowing through the throat to become air borne, a turbulent liquid wash means for receiving the combined air streams and for mixing the same turbulently with liquid particles to form a turbulent water and an air wash for removing air borne particles, an eliminator passage in said housing for receiving the air from the turbulent wash means and for eliminating liquid particles carried by air flowing prior to discharge of the air from the booth.

2. A spray booth in accordance with claim 1 in which said turbulent liquid wash means comprises an air flow throat into which flow the first and second air streams with the velocity of the combined air streams being raised to high velocity of at least about 4000 fpm and in which liquid from said first and second wash means flows into said throat and a substantial portion thereof becomes air borne by the high velocity air and the air borne liquid is swirled turbulently after leaving said throat to wet air borne spray particles.

3. A spray booth in accordance with claim 2 in which said throat includes an air deflector plate adjustably positioned to change the cross sectional area of the throat and thereby the air flow velocity through said throat.

4. A spray booth in accordance with claim 3 in which a second water application means flows water along said air deflector plate and into said throat to be lifted as air borne water particles for the turbulent wash means.

5. A spray booth in accordance with claim 4 in which said first water wash means is disposed above said second wash means and first water wash means discharges its liquid as a water curtain into the second water wash means with the second air stream being washed by this water curtain.

6. A multiple water wash spray booth comprising, in combination, a spraying section having an open-faced front user portal with grated flooring means, and air circulating means in the ceiling of the spraying section for circulating air from the open-faced front toward the rear of the user portal;

an air cleaning section comprising first water wash means underlying the grated flooring means of the spraying section and comprising spillway means sloping downward from the front toward the rear of the spraying section, and means for introducing a continuous thin sheet of water uniformly across the spillway means;

second water wash means at the rear of the spraying section having a plurality of baffle surfaces extending across the width of the spraying section from the top thereof toward the spillway means with a space therebehind, the bottoms of the baffle surfaces and surface of the spillway means defining a space therebetween, and means for introducing a continuous thin sheet of water across the baffle surfaces;

third water wash means comprising deflector plate means and means for introducing a continuous thin sheet of water across the surface of the deflector plate, ramp means sloping downwardly from the space between the spillway means and the lower edge of the baffle surfaces, the surface of the ramp being in spaced relationship with the lower edge of the deflector plate to define a throat to increase the air flow velocity to lift water to form a mixture of air and water to wet air borne particles;

water reservoir means below the water washes to collect the water flowing from the water washes and for contacting downwardly directed air;

means defining an upwardly extending passageway for the air after the air has contacted the water reservoir means;

means disposed in the upwardly extending passageway for removing moisture from the air, and means for circulating air through the spray booth.

7. The combination of claim 6 wherein the deflector plate of the third water wash is pivotally connected to the water introduction means of the said third water wash so as to permit the cross sectional area defined by the space between the deflector plate and the ramp means to be varied.

8. The combination of claim 6 wherein a water lift means is provided on said ramp to lift water flowing therealong to assist in the water becoming air borne.

9. In a spray booth for capturing air borne particles by wetting the same with a liquid, said spray booth comprising:

a housing having a spraying chamber in which will be present air borne spray particles, a first vertical baffle wash means having a plurality of staggered baffle plates through which a first air stream flows rearwardly in a generally horizontal path from the spray chamber, water application means for flowing a cascade of water down the baffle plates for trapping air borne spray particles being carried by the first air stream, a ceiling in said housing and including air flow means associated therewith for blowing air across the ceiling and rearwardly toward said baffle wash means to join in the first air stream, a floor in said spray chamber having air flow passages therethrough through which a second air stream flows in a downward path through the floor passages, means for directing the first air stream downwardly and means for directing the second air stream rearwardly to converge, throat means for raising the velocity of the air streams sufficiently to lift water to wet air borne particles, and a turbulent liquid wash means for receiving the first and second air streams and for mixing the same turbulently with liquid particles to form a turbulent water and an air wash for removing air borne particles.

10. A spray booth in accordance with claim 9 in which said baffle plates have lower ends disposed above the second air stream and in which liquid falling from these lower ends creates a water curtain to wet particles being transported by the second air stream.

11. A method of capturing air borne sprayed particles within a spray booth by wetting the same with a liquid with a plurality of liquid washes, said method comprising the steps of:

flowing a first stream of air carrying sprayed particles from a spray chamber rearwardly in a generally horizontal path into and through a vertically extending wash means having staggered baffle plates coated with a downwardly flowing film of water to wet the spray particles contacting the water film, flowing a second stream of air downwardly through a floor in the booth and flowing the second stream of air across a lower second liquid wash means beneath the floor, flowing the first air stream rearwardly of the staggered panels and flowing the second air stream rearwardly, joining the first and second air streams together and increasing the velocity of the combined streams of air flow through a constricted throat to an air velocity sufficient to lift water particles, and deflecting the combined air streams and water particles into a swirling turbulent flow to wet sprayed particles being subjected to the turbulent flow, and removing water particles from the combined air streams and discharging the same.

12. A method in accordance with claim 11 including the step of adjusting the cross sectional area of a throat through which pass the combined air streams until the static pressure therein is about 4 to 5 inches of water.

13. A method in accordance with claim 11 including the step of blowing air across the ceiling of the spray booth to prevent coating of the ceiling with sprayed particles.

14. A method in accordance with claim 13 including the steps of spraying paint particles upwardly onto the undersurface of articles or reciprocating the paint spray vertically from a position adjacent the ceiling to a position adjacent the floor.

15. In a spray booth for capturing air borne particles by wetting the same with a liquid, said spray booth comprising:

a housing having a spraying chamber in which will be present air borne spray particles, a first vertical baffle wash means having a plurality of staggered baffle plates through which a first air stream flows in a generally horizontal path from the spray chamber, water application means for flowing a cascade of water down the panels for trapping air borne spray particles being carried by the first air stream, a floor in said spray chamber having air flow passages therethrough through which a second air stream flows in a downward path through the floor passages, a second wash means for washing the second air stream for removing air borne spray particles from the second air stream, a turbulent liquid wash means for receiving the first and second air streams and for mixing the same turbulently with liquid particles to form a turbulent water and an air wash for removing air borne particles, an eliminator passage in said housing for receiving the air from the turbulent wash means and for eliminating liquid particles carried by air flowing prior to discharge of the air from the booth, said turbulent liquid wash means comprising an air flow throat into which flow the first and second air streams with the velocity of the combined air streams being raised to high velocity of at least about 4000 fpm and in which liquid from said first and second wash means flows into said throat and a substantial portion thereof becomes air borne by the high velocity air and the air borne liquid is swirled turbulently after leaving said throat to wet air borne spray particles, said second wash means comprising a downwardly inclined surface with liquid flowing therealong into the throat and in which water lift means are provided at the throat to cause the liquid to leave the inclined surface.

16. A spray booth in accordance with claim 15 in which said water lift means comprises an upwardly inclined surface to cause the liquid to flow upwardly an edge thereof and then for being lifted into the air stream flowing through said throat.

* * * * *

UNITED STATES PATENT AND TRADEMARK OFFICE
CERTIFICATE OF CORRECTION

PATENT NO. : 4,608,064
DATED : August 26, 1986
INVENTOR(S) : Stanley C. Napadow

It is certified that error appears in the above-identified patent and that said Letters Patent is hereby corrected as shown below:

In the claims.

Claim 16.   Column 10, line 48 after "upwardly" insert --to--.

Signed and Sealed this

Sixteenth Day of December, 1986

*Attest:*

DONALD J. QUIGG

*Attesting Officer*     *Commissioner of Patents and Trademarks*